Figure 1:
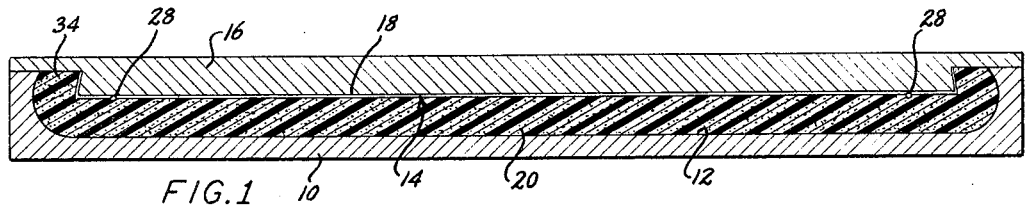

Sept. 20, 1966 W. L. RIDENOUR 3,273,179
INSULATOR FOR FOAM PADS AND METHOD OF MAKING THE SAME
Filed March 19, 1963

INVENTOR
WILLIARD L. RIDENOUR

BY
ATTORNEY

United States Patent Office 3,273,179
Patented Sept. 20, 1966

---

3,273,179
INSULATOR FOR FOAM PADS AND METHOD OF MAKING THE SAME
Williard L. Ridenour, Ann Arbor, Mich., assignor, by mesne assignments, to Hoover Ball and Bearing Company, Saline, Mich., a corporation of Michigan
Filed Mar. 19, 1963, Ser. No. 266,347
3 Claims. (Cl. 5—354)

The invention pertains to an insulator for foam pads, and the method for making the same, and particularly relates to foam pad insulators which are bonded to the pad during the foaming thereof.

It is common in the construction of cushions and pads to employ an insulator intermediate the cushion, or pad, and the spring structure supporting the pad. The purpose of the insulator is to protect the cushion, or pad, from the springs to prevent abrasion from the springs from damaging the cushion, to distribute the load imposed on the pad to the springs, and also to prevent the padding of the cushion being pushed or worked into the springs. In the construction of foam cushions, such as of foam rubber or foamed urethane, it is also common to use insulators for the purpose as set forth above. In such instances, it is known to mold the insulator to the cushion, or pad, during the foaming of the pad. One arrangement of this type is shown in United States Patent No. 3,005,213.

In the manufacture of foam pads and cushions wherein the insulator is placed upon the upper surface of the foam, during the foaming and rising thereof, difficulty has been encountered in maintaining the insulator in the desired relationship to the upper surface of the rising foam. To insure that the desired dimensional characteristics and cushioning effect of the pads are maintained, it is important that the insulator be located at its designed location, which is usually substantially coplanar with the spring-supported surface of the pad. In constructions, as shown in the above-mentioned patent, little difficulty is encountered in properly placing the insulator, in that the insulator is preattached to a spring basket which may be accurately positioned relative to the seat pad mold. However, in seat constructions wherein the insulator is not attached to spring structure, the insulator, usually a burlap or Cottonet sheet, is placed upon the rising foam, and an upper mold half is employed to shape the foam as it rises thereagainst. The difficulty, which has been previously encountered in placing the insulator upon the rising foam, lies in the tendency for the insulator to "sink" into the foam, whereby in the finished product the insulator will be located slightly below the pad spring-supporting surface, rather than coplanar therewith so as to engage the spring structure as intended. When the insulator "sinks" into the pad during the molding operation, the distance, between the insulator and the pad load-supporting surface, is reduced and is inconsistent. Thus, the designed cushioning thickness of foam is not available. The above-described problem is aggravated when reinforcing strands, such as wire lengths, are woven through the insulator to strengthen the same, which is common practice. The added weight of the reinforcing wire strands increases the tendency for the insulator to "sink" into the foam.

An object of the invention is to provide an insulator which may be molded to a foam pad, or cushion, during the foaming thereof, wherein the insulator will remain coplanar with the upper rising surface of the foam and, thus, be substantially coplanar with the pad spring-supported surface in the finished form. This object is achieved by employing a sheet, which is relatively impervious to foam, in conjunction with the insulator sheet, which is attached to the insulator sheet whereby the foam-impervious sheet will not "sink" into the rising foam but, rather, floats thereupon.

Another object of the invention is to provide an insulator for foam cushions and pads wherein the insulator includes a foam-pervious sheet for intimate bonding with the foam and a foam-impervious sheet which permits the insulator to "float" upon the rising foam.

Yet another object of the invention is to provide an insulator for foam pads and cushions, wherein a foam-pervious insulator sheet is associated with a foam-impervious sheet in such a manner as to permit effective bonding of the insulator sheet to the foam, yet maintain an effective connection and relationship with the foam-impervious sheet so as to prevent "sinking" of the insulator sheet into the rising foam.

Another object of the invention is to provide an insulator for foam pads and cushions employing a foam-pervious sheet and a foam-impervious sheet, wherein reinforcing strands are woven through the sheets and simultaneously reinforce the sheets and maintain the sheets in a predetermined assembled relationship.

Figure 2:
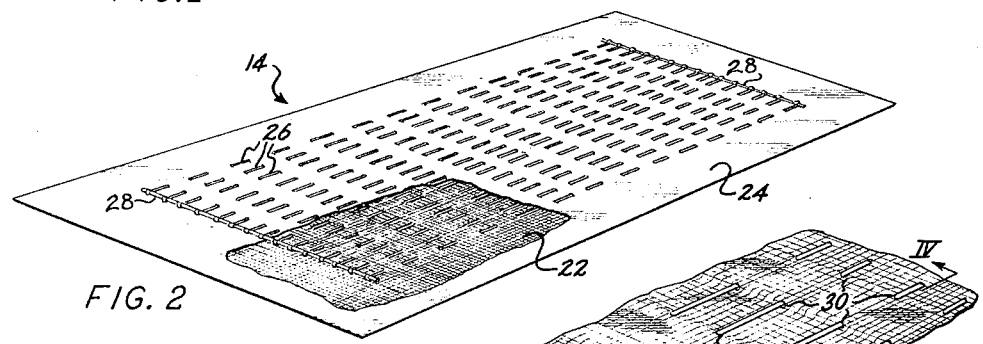
Figure 3:
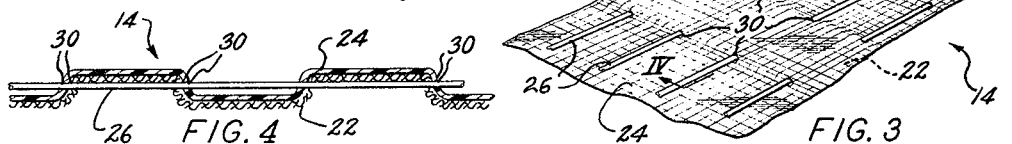
Figure 4:
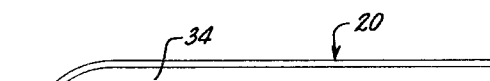
Figure 5:
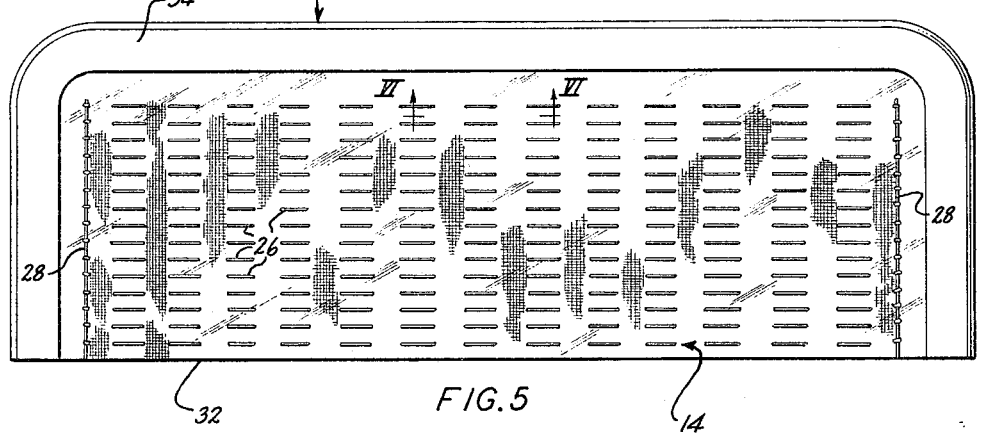
Figure 6:
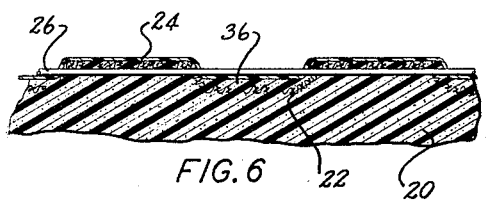

These and other objects of the invention arising from the details of the components and relationships thereof will be apparent from the following description and accompanying drawings wherein:

FIG. 1 is an elevational, sectional view of a seat pad mold, and pad during the molding thereof, in accord with the invention, FIG. 2 is a perspective view of an insulator in accord with the invention, a portion of the foam-impervious sheet being removed for purposes of illustration, FIG. 3 is an enlarged, detail, perspective view of an insulator, in accord with the invention, illustrating the relationships of the components, FIG. 4 is an elevational, sectional view taken along section IV—IV of FIG. 3, FIG. 5 is a plan view of the underside of a seat pad employing the insulator in accord with the invention, and FIG. 6 is an elevational, sectional, detail, enlarged view of the assembled insulator and seat pad, as taken along section VI—VI of FIG. 5.

Though not limited for use with any particular method of molding a seat pad, the insulator, in accord with the invention, is particularly advantageously employed with a seat pad constructed in accord with the arrangement of FIG. 1. In this type of seat pad manufacture, a lower mold half 10 having a cavity 12 is charged with an activated polyurethane foam mixture. Though the foam mixture could be of any conventional type which is suitable for producing a seat pad, the invention is normally employed with a polyurethane foam seat which may be of a composition similar to that shown in United States Patent No. 3,005,213.

After the mold cavity 12 has been charged with the activated foam mixture, the foam begins to rise in the cavity. Thereupon, an insulator 14 is placed upon the rising foam and, if desired, the upper mold portion half 16 may then be placed in position upon the lower mold half 10, or the insulator 14 may be prepositioned on the upper mold portion half 16 by preattaching the outer edges of the insulator, which are not to be in contact with the foam, to the upper mold portion half 16. The foam then lifts the insulator into engagement with the underside surface 18 of the upper mold half 16, the pad is precured, and then the upper mold half is removed, and the seat pad 20 stripped from the lower mold. If the outer edges of the insulator have been attached to the upper mold portion, the edges may be released before the pad is demolded, to facilitate demolding. If desired the upper mold half 16 may be permitted to rise from the lower half 10, due to the rising of the foam, and the upper mold half is then placed upon the lower mold half during the latter stages of the foam gelation. This procedure is described in Patent No. 3,056,168.

When employing the before-described seat pad molding process with conventional spring insulators, such as burlap or Cottonet, which is pervious to the foam, the insulator sheet has a tendency to permit the foam to completely penetrate through the insulator and, in effect, "sink" into the foam. Thus, the insulator will not coincide with the spring-supported surface of the seat pad, which is formed by the mold upper half surface 18.

The insulator of the instant invention consists of a sheet 22 of insulator material, such as burlap or Cottonet, of sufficient dimension to cover the spring-supported area of the seat pad 20. It is the usual practice to make the insulator sheet larger than required, wherein the excess is trimmed after the seat pad is molded.

A sheet 24, of a material which is substantially impervious to the foam, is superimposed upon the insulator sheet 22, and will usually be of similar configuration and dimensions, whereby the border excess may also be removed during trimming. The primary purpose of the sheet 24 is to permit the insulator to "float" upon the rising foam. It is desirable that the sheet 24 be of a highly flexible nature so as not to interfere with the cushioning characteristics of the pad and springs, and should be of lightweight so as not to add materially to the weight of the insulator. While a number of materials could be suitable for the sheet 24, in accord with the before-mentioned characteristics, polyethylene film of a thickness of 1.5 mil, for instance, is very acceptable, and is used in the commercial form of the invention. In the drawing, the sheet 24 is shown as a transparent film of polyethylene for purposes of illustration. However, the film light-conducting characteristics are immaterial to the inventive concepts.

For the sheet 24 to permit the insulator sheet 22 to "float" upon the foam, it is necessary that the foam-impervious sheet 24 be attached to the insulator sheet 22. It is within the scope of the invention to affix the sheets 22 and 24 together by bonding or cementing at selected locations, or by employing fasteners such as staples or hog rings. However, in the preferred embodiment, it is desired to reinforce the insulator with a plurality of reinforcing wire strands. The use of reinforcing wire strands with fabric insulator sheets is well known in the art, and the use of such wires provides such reinforcement as to render the insulator pad fully capable of performing its function, yet the wires contribute improved load distribution characteristics and increased wear and abrasion resistance to the insulator over insulators which do not employ such reinforcement.

In the preferred embodiment, after the sheet 24 is superimposed over the sheet 22, a plurality of straight, parallel reinforcing wires 26 are woven through the sheets 22 and 24 in the manner which will be apparent from FIGS. 3 and 4. It will be noted that the wires are alternately located on the outer surface of the sheet 22 and the outer surface of the insulator sheet 24. The wires 26 are preferably wrapped about a pliable cord or strand 28 at each end to prevent the strands from being removed from the insulator structure.

The effect of weaving the wires 26 through the sheets 22 and 24, in the illustrated manner, is one of attaching the insulator sheet 22 to the foam-impervious sheet 24, as well as reinforcing the insulator sheet 22. As the reinforcing wires 26 pierce the sheet 22 and the insulator sheet 24 at common locations 30, and as the weaving action forms a sinuous configuration of the sheets, it will be appreciated that the sheets 22 and 24 will be maintained in adjacent relation at the common intersections 30 of the sheets and the reinforcing wires. Those sheet portions intermediate the locations 30, where the sheets are pierced by the reinforcing wires, will be maintained in adjacent relationship but will not be rigidly affixed together.

The fully assembled insulator 14 has the appearance of that shown in FIG. 2 when it is placed upon the rising foam within the mold half 10. FIG. 5 illustrates the relationship of the insulator to the pad 20 after the seat pad has been formed and removed from the mold. The edge 32 designates the rear of the seat pad, and the side and front portions of the seat pad are provided with a downwardly extending marginal "flange" 34. The pad recessed portion, in which the insulator 14 is located, constitutes the spring-supported surface of the pad formed by mold surface 18.

As will be noted from FIGS. 5 and 6, substantially one-half of the lengths of the reinforcing wires 26 will be directly exposed to the spring structure upon which the pad 20 is supported. The other half of the wires will be contacted by foam, which has a strong bonding affinity for metal. Thus, the wires 26 will be effectively associated with both the seat pad and the supporting spring structure.

An advantage of connecting the sheets 22 and 24 at spaced locations will be apparent from FIG. 6. It will be noted that a limited separation between insulator sheet 22 and the foam-impervious sheet 24 has occurred at those locations wherein the sheets pass "under" the reinforcing wires 26. Thus, an elongated "pocket" 36 is defined at these regions between the sheets. The pocket 36 results from the fact that the rising foam penetrates the insulator sheet 22 and continues through the insulator until it engages the sheet 24 and, as the foam which penetrates the insulator sheet expands slightly after passing through the sheet, a separation occurs between the sheets 22 and 24 forming the pockets 36. The tendency for the pockets 36 to "inflate" helps to maintain the insulator sheet portions, which pass over the wires 26, in engagement with the wires, note FIG. 6. Because of the foam within pockets 36, the underside of the seat pad 20 will have the appearance of FIG. 5 wherein the insulator sheet 22 will be visible only at those portions wherein the sheet 24 is on top of the wires 26 as viewed in FIG. 6.

Due to the separation of the sheets 22 and 24 in the pocket regions 36, the insulator sheet 22 will be very effectively affixed to the foam pad, yet the sheet 24 prevents undesirable penetration of the insulator sheet into the pad. It will be appreciated that the insulator sheet 22 will be bonded to the foam over its complete area. However, in the pocket regions the foam will be on both sides of the insulator sheet.

It is also significant to note that the insulator construction of the invention will maintain the reinforcing wire strands 26 substantially coplanar with the seat pad spring-supporting structure and, thus, make the very best use of the reinforcing strands, as they will be disposed immediately adjacent the pad-supporting spring structure.

It is appreciated that various modifications to the invention may be apparent to those skilled in the art without departing from the spirit and scope thereof, and it is intended that the invention be defined only by the scope of the following claims.

I claim:
1. In combination, a foam pad having a spring-supported surface, a spring insulator molded to said pad upon said surface, said insulator including a flexible foam-pervious sheet disposed adjacent the foam defining said surface, a flexible, lightweight, foam-impervious sheet superimposed upon the side of said pervious sheet remote from the pad foam, and means affixing said sheets together at spaced locations permitting limited separations of said sheets intermediate said spaced locations, whereby said sheets will be maintained adjacent said pad surface during foaming of said pad and foam, and a portion of the foam adjacent said surface will completely penetrate said pervious sheet intermediate said spaced locations.

2. In combination, a foam pad having a spring-supported surface, a spring insulator molded to said pad upon said surface, said insulator including a flexible foam-pervious sheet disposed adjacent the foam defining said surface, a flexible, lightweight, foam-impervious sheet superimposed upon said pervious sheet on the side thereof remote from the pad foam, and a plurality of reinforcing strands woven through said sheets intersecting said sheets at common locations, thereby maintaining said sheets in adjacent and mutually affixed relation, said strands being disposed substantially within the plane of said pad surface.

3. In a combination as in claim 2, wherein said reinforcing strands consist of a plurality of parallel wires and said foam-impervious sheet consists of a polyethylene film.

References Cited by the Examiner
UNITED STATES PATENTS

| | | | |
|---|---|---|---|
| 706,590 | 8/1902 | Osgood et al. | 264—45 |
| 1,835,212 | 12/1931 | Fowler | 5—351 |
| 2,540,331 | 2/1951 | Hlavaty | 98—31 |
| 2,724,676 | 11/1955 | Randall et al. | 264—45 |
| 2,779,036 | 1/1957 | Platt | 5—354 |
| 2,816,054 | 12/1957 | Howden | 156—290 X |
| 2,851,390 | 9/1958 | Chavannes | 161—113 |
| 2,940,512 | 6/1960 | Reed | 5—354 |
| 2,950,221 | 8/1960 | Bauer et al. | 161—118 |
| 2,950,505 | 8/1960 | Frank | 264—45 |
| 3,005,213 | 10/1961 | Brown et al. | 5—354 |
| 3,024,475 | 3/1962 | Reed | 5—354 |
| 3,112,987 | 12/1963 | Griffiths et al. | 264—45 |

FOREIGN PATENTS

| | | |
|---|---|---|
| 560,900 | 7/1958 | Canada. |
| 1,086,025 | 7/1960 | Germany. |

OTHER REFERENCES

German printed application Ser. No. F 16,225, Friedrich, December 1955.

FRANK B. SHERRY, *Primary Examiner.*

MORRIS SUSSMAN, CASMIR A. NUNBERG, *Examiners.*

A. M. CALVERT, *Assistant Examiner.*